Figure 1:
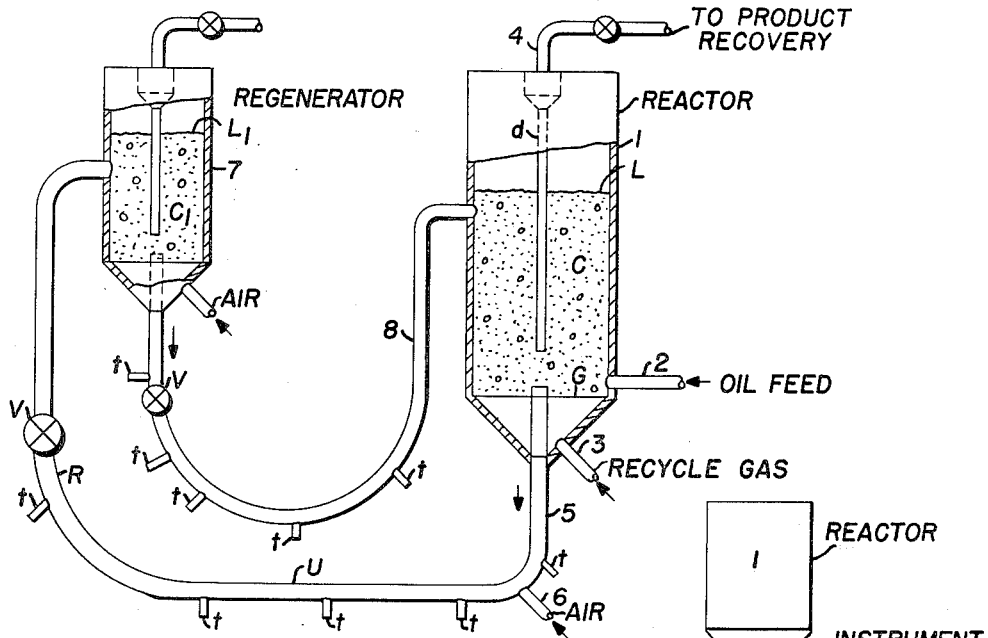

Feb. 12, 1957   W. W. BOISTURE ET AL   2,781,234
AUTOMATIC CONTROL OF STANDPIPE AND U-BEND AERATION
Filed May 18, 1954

Worth W. Boisture
James F. Ross    Inventors

By J. Cashman Attorney

United States Patent Office 2,781,234
Patented Feb. 12, 1957

2,781,234

AUTOMATIC CONTROL OF STANDPIPE AND U-BEND AERATION

Worth W. Boisture and James F. Ross, Baton Rouge, La., assignors to Esso Research and Engineering Company, a corporation of Delaware Application May 18, 1954, Serial No. 430,704

6 Claims. (Cl. 302—66)

This invention relates to the catalytic conversion of hydrocarbons and more particularly to the catalytic reforming or hydroforming, of hydrocarbon fractions boiling in the motor fuel or naphtha range, of low knock rating into high octane number motor fuels rich in aromatics, by the fluidized solids technique.

It is known that petroleum naphthas can be subjected to a reforming treatment to yield liquid products boiling within the gasoline boiling range and possessing improved octane numbers and better engine cleanliness characteristics. A well known and widely used process for upgrading petroleum naphthas is called hydroforming. In hydroforming, the naphtha feed stock is treated at elevated pressures of from about 50 to 1000 lbs. per sq. inch and at temperatures of 750–1050° F. in the presence of a solid catalyst and hydrogen or recycle gas rich in hydrogen. A variety of reactions including dehydrogenation, paraffin and naphthene isomerization, cyclization or aromatization, hydrogenation and hydrocracking occur during hydroforming.

Catalysts that have been used in hydroforming include metals such as platinum or palladium and oxides and sulfides of certain metals, particularly, molybdenum, chromium, vanadium and tungsten. These catalysts are usually supported on a base or spacing agent, preferably on an adsorptive or high surface area alumina-containing composition such as various activated aluminas, alumina gel, zinc aluminate spinel and the like.

It has been proposed to effect the hydroforming of naphtha fractions in a fluidized solids reactor system in which the naphtha vapors are passed continuously through a dense fluidized bed of finely divided hydroforming catalyst particles in a reaction zone, spent catalyst being withdrawn continuously from the dense bed in the reaction zone and passed to a separate regeneration zone where inactivating carbonaceous deposits are removed by combustion whereupon the regenerated catalyst particles are returned to the main reactor vessel or hydroforming reaction zone. Fuid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled to maintain catalyst activity and selectivity at a relatively constant level rather than fluctuating over a relatively wide range.

Difficulty has been encountered in achieving a heat balanced operation in fluid hydrofroming. Because of selectivity considerations, low catalyst to oil ratios must be maintained in the hydroforming reaction zone and this low catalyst to oil ratio limits the amount of heat that can be transferred to the reaction zone by the catalyst. Since the amount of heat released in the regenerator is so great that the catalyst is incapable of transferring it to the reaction zone at the low catalyst to oil ratios used, it is common practice to arrange cooling coils in the regenerator to remove heat over and above that which can be safely transferred to the reactor by the catalyst. It is, therefore, necessary to supplement the heat supplied by the catalyst and this is done by preheating the feed stock and recycle or hydrogen-rich process gas to temperatures well above the average reactor temperature. This preheating has an adverse effect upon the yield of liquid products since it brings about thermal degradation of the feed as well as the higher molecular weight constituents of the recycle gas. Moreover, excessively large amounts of recycle gas must be introduced to carry heat into the reaction zone. The cost of installing and operating this extra compressor and heat exchange capacity adds very substantially to the total plant costs.

It has been proposed to overcome this heat transfer problem by circulating inert, heat-transfer solids or "shot" between the reactor and regenerator for absorbing heat in the regenerator and carrying that heat into the reaction zone. It would be a relatively simple matter, of course, to add inert solids to the catalyst and circulate a homogeneous mixture between the reactor and regenerator. However, this would not be practicable because the use of about 3 to 5 parts of heat transfer solids per part of the catalyst would require a reduction in hydrocarbon feed rate to the reactor to one fourth or less because valuable reactor space is occupied by inert heat transfer solids rather than by catalyst.

It is an object of this invention to provide the art with an improved method and apparatus for reforming hydrocarbon fractions by the fluidized solids technique.

It is also an object of this invention to provide the art with a simple, economical fluidized solids reactor system in which inert heat transfer solids are circulated between the reaction zone and the regeneration zone.

It is a further object of this invention to provide a fluidized solids reactor system in which inert heat transfer solids are circulated between the reaction zone and the regeneration zone and in which the weight ratio of shot to catalyst in the circulating fluid solids stream is easily controlled.

A further objective of the present invention is to provide means for causing a smooth flow of an aerated mixture of catalyst and shot through the standpipes of the catalyst and shot circulating system.

It is a further objective of the present invention to provide automatic means operable to control the flow of solids in transfer lines, and in particular, to control such flow around bends and curves in the said lines to suppress the tendency of the flowing solids to plug or otherwise to correct inefficient or erratic flow of the said solids.

In a fluidized solids cracking or reforming system wherein a dense inert material, such as mullite shot, is circulating co-currently with a less dense catalytic material, the tendency of the heavy shot particles to settle through the fluidized bed gives rise to serious problems in maintaining proper circulation during periods of erratic operation of the fluidized solids system. The primary cause of this difficulty is the tendency of the shot to concentrate in standpipes and U-bends and hence, further aggravate and cause irregularity in the solids circulating system, by increasing the gas pressure drop across U-bends and curves in the catalyst transporting lines. This difficulty is greatly magnified during periods when the circulation of solids must be completely stopped.

The present invention provides means for correcting this difficulty during periods of erratic circulation in the transfer lines or during circulating stoppages by the introduction of relatively larger quantities of aeration gas, say, 2–5 times that normally required to maintain the flowability of the solids in the transfer lines, the gas being introduced into the standpipes and also into the bottom of U-bends, which gas introduction rapidly lowers the density of the solids in the standpipes and rapidly effects an improvement in the flowability of the solids and smooth circulation of the same from vessel to vessel, all of which will appear more fully hereinafter.

Figure 2:
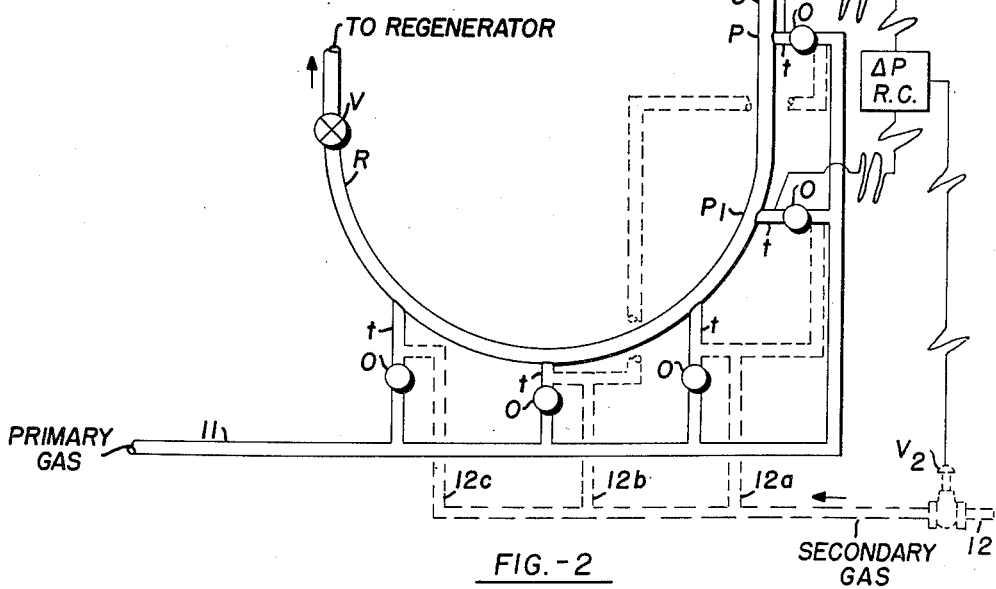

In the accompanying drawing there is shown in Figure 1 the essentials of an apparatus utilizable in hydroforming naphthas using a fluidized catalyst such as molybdenum oxide carried on an active form of alumina; and Figure 2 is a fragmentary showing of the apparatus of Figure 1 enlarged and containing details as to the method of automatically increasing the flowability of solids in a transfer line including a U-bend.

Similar reference characters refer to similar parts in the views.

Referring in detail to Figure 1, $l$ represents a hydroforming vessel containing a bed of solids consisting of a mixture of powdered hydroforming catalyst intermixed with shot, say, mullite, having an average particle size of about 200–800 microns as compared to the catalyst which has an average particle size of about 50–150 microns. This bed of solids extends from a grid or screen G to an upper dense phase level L. The naphtha to be hydroformed after suitable preheating is charged to the bed of catalyst and shot through feed line 2. Simultaneously, recycle gas containing 65–80 vol. percent hydrogen, which gas is obtained from the product recovery system (not shown) is charged into the bottom of reactor 1 from line 2 and is mixed with the oil vapors in the bed of catalyst C. Under known conditions of temperature, pressure and gasiform space velocity, the desired hydroforming reaction occurs and the product emerges from the bed of solids and passes through a solids disengaging space extending from L to the top of the reactor. Before the product is withdrawn from the reactor 1, it is caused to flow through one or more gas-solids separating devices wherein solids still entrained in the vapors are removed and the removed solids are returned to the bed phase through one or more dip pipes $d$. The raw product is withdrawn overhead from reactor 1 through line 4 and passed to the product recovery system where it is subjected to conventional distillation and other conventional purification methods (not shown) to recover the desired hydroformed product, and the hydrogen-containing gas for recycling to reactor 1.

As previously indicated, it is necessary to regenerate the catalyst which has become deactivated by the deposition thereon of carbon and sulfur-containing deposits, which result from the reforming or cracking reactions. Toward this end catalyst is withdrawn from reactor 1 through standpipe 5 and comingled with air injected into the base of said standpipe from line 6. Because the catalyst withdrawn from the reactor has both hydrogen and hydrocarbon associated therewith, it is conventional to pass the catalyst through a stripper wherein it is treated with a stripping gas, such as steam to dislodge the adsorbed or occluded hydrogen and hydrocarbons before they contact the air. This stripper which is usually outside the reactor is not shown in the drawing since its construction use is well known and the invention does not reside in stripping. The withdrawn catalyst is carried in suspension in the gas around U-bend U and then upwardly through riser R, controlled by slide valve V, into the regenerator 7. It will be noted the standpipe 5, the U-bend and the riser R are provided with gas tops $t$, through which small amounts of gas (e. g. air) may be injected for the purpose of maintaining the solids in this transport system in well fluidized and, therefore, smoothly flowable condition. During upset conditions, or when circulation of solids is stopped for any reason, the shot tends to settle through the catalyst to the bottom of the U-bend U which condition seriously interferes with the resumption of smooth solids flow.

In Figure 2 there is depicted diagrammatically means for correcting these insufficiencies in solids flow. Referring again to Figure 1 the solids are formed into a fluidized bed $C_1$ in regenerator 7 and in the presence of the air, the catalyst and the shot undergo oxidative treatment to remove the carbonaceous and other deposits therefrom and the solids substantially freed of carbonaceous and sulfur-containing material are returned via the return line 8 to reactor 1 as shown. The return line 8 is also provided with gas taps $t$ through which small amounts of gas may be injected to fluidize the solids, and the rate of flow of solids in the said return line is controlled by a slide valve V. This, in brief, is a description of an operation carried out in a conventional 2-vessel fluidized solids system. While the description has been set forth as applied to a hydroforming operation, it is pointed out that this is merely illustrative of one type of the broad concept wherein gases or vapors are contacted with fluidized solids in one vessel and the solids are transported to a second vessel in open communication with the first vessel for contacting with gasiform material in the second vessel, while in the form of a fluidized bed, and smooth flow of solids is maintained in the transfer lines connecting the vessels, by means described in detail hereinafter.

Referring to Figure 2, as before, it will be noted that standpipe 5, U-bend U and riser R are provided with gas taps $t$, which taps are manifolded with the primary fluidizing gas supply line 11. This system in normal operation charges about 100 standard cubic feet per hour of gas per 500–2000 pounds per hour of solids transported through the transfer line. Each of these gas taps $t$ is provided with an orifice O. An instrument identified by the letters ΔPRC (delta pressure recorder and controller) is in communication with the gas taps $t$ in leg 5 of the transfer line. When, due to an upset or stoppage of circulation, the shot settles through the catalyst to the bottom of the U-bend U, the increased density of the said shot and catalyst causes an increase in the differential pressure between points P and $P_1$ in standpipe 5. The control device, ΔPRC, in response to this increased differential pressure, causes an opening of valve $V_2$, which thereby causes an increased flow of fluidizing gas to the taps $t$ through lines 12a, 12b and 12c. This additional gas lowers the density of the mixture within the U-bend, thereby improving its fluidity, thus making it possible to more quickly and easily restore the unit to smooth operation. The instrument represented by ΔPRC and the connecting lines do not, per se, form a part of the present invention, for this instrument apparatus may be purchased from any number of manufacturers in this country. When the upset in the system, and particularly, when the pressure drop between the points P and $P_1$ in leg 5 is restored to normal, the flow of secondary gas through the taps $t$ is discontinued in the lines represented by dotted lines 12a, 12b and 12c and the said gas taps are fed only from primary gas line 11.

It is deemed unnecessary to describe in detail any particular chemical process or hydrocarbon conversion as previously indicated since the present improvements apply broadly to any system wherein it is necessary to transport a mixture of solids of different densities and/or particle size through transfer lines and around curves and bends to maintain the flow of said solids smoothly, and without plugging, and otherwise to maintain the solids transport lines in good operative state.

It will be understood that many modifications of the present invention may be made by those who are familiar with the art without departing from the spirit thereof.

What is claimed is:

1. The method of maintaining the flowability of an aerated mixture of solids of widely different bulk densities and particle size in a system wherein the said mixture flows around curves and bends in at least one transfer line, the improvement which comprises correcting erratic flow or stoppage of flow of said mixture of solids by injecting from about 2–5 times the amount of an aerating gas normally required to maintain smooth flowability of the said mixture of solids into the transfer line system responsive to the tendency of the said mixture of solids to plug the said line as a result of said erratic flow or stoppage of flow, as evidenced by an increase in the gas pressure between two predetermined points whereby the said mixture is maintained in smoothly flowing state.

2. The method set forth in claim 1 in which the transfer line system comprises a standpipe, a U-bend and a riser leg, and further, in which said additional gas is injected into the component parts of the transfer line responsive to an increase in differential pressure over a section of the standpipe riser leg whereby the said mixture is caused to flow smoothly through the transfer system.

3. The method of transferring an aerated stream of a mixture of subdivided solids through a system comprising a standpipe, a U-bend and a riser leg and maintaining the stream in a substantially smooth steady flowing state, which comprises correcting erratic flow or stoppage of flow of said mixture of solids by injecting additional aerating gas at spaced points into said stream, the amount of said additional gas being 2–5 times that normally required to maintain smooth flowability of the said mixture of solids responsive to erratic flow or stoppage of flow of said stream, as evidenced by increase in the gas pressure between two predetermined points, the said solids comprising a mixture of a catalyst having an average particle size of from about 50–150 microns and shot having an average particle size of from about 250–800 microns, whereby said mixture is maintained in smoothly flowing state.

4. The method set forth in claim 3 in which the system through which the solids are transferred comprises a U-bend and a riser leg and in which additional gas is injected into the U-bend responsive to an upset in the flow of solids therethrough.

5. The method set forth in claim 3 in which the system through which the solids are transferred comprises a V-bend and a riser leg and in which additional gas is injected into the V-bend responsive to an upset in the flow of solids therethrough.

6. The method of transferring an aerated stream of subdivided solids through a system comprising a standpipe, a U-bend and a riser leg which comprises correcting erratic flow or stoppage of flow of said mixture of solids by injecting additional quantities of an aerating gas at spaced points in said standpipe responsive to erratic flow or stoppage of flow of said stream, as evidenced by an increase in the gas pressure between two predetermined points in said riser leg, the amount of said additional aerating gas being from 2–5 times that normally required to maintain smooth flow of the said solids, the said solids comprising a mixture of a catalyst having an average particle size of from about 50–150 microns and shot having an average particle size of from about 250 to 800 microns.

References Cited in the file of this patent
UNITED STATES PATENTS

| | | |
|---|---|---|
| 2,311,564 | Munday | Feb. 16, 1943 |
| 2,623,793 | Hill | Dec. 30, 1952 |